United States Patent

[11] 3,586,974

| [72] | Inventors | Donald M. Ham<br>Rochester;<br>Joseph G. Russillo, Jr., Dover, both of, N.H. |
|------|-----------|---|
| [21] | Appl. No. | 812,670 |
| [22] | Filed | Apr. 2, 1969 |
| [45] | Patented | June 22, 1971 |
| [73] | Assignee | General Electric Company |

[54] RESET MECHANISM FOR A CUMULATIVE DEMAND REGISTER
20 Claims, 5 Drawing Figs.

| [52] | U.S. Cl. | 324/103 R |
|------|----------|-----------|
| [51] | Int. Cl. | G01r 19/16 |
| [50] | Field of Search | 324/103 |

[56] References Cited
UNITED STATES PATENTS

| 2,006,321 | 6/1935 | Stark et al. | 324/103 |
| 2,424,689 | 7/1947 | Hamill | 324/103 |
| 2,497,678 | 2/1950 | Macintyre et al. | 324/103 |

Primary Examiner—Rudolph V. Rolinec
Assistant Examiner—Ernest F. Karlsen
Attorneys—Vale P. Myles, Francis X. Doyle, Frank L. Neuhauser and Oscar B. Waddell ABSTRACT: A demand register reset mechanism that is characterized by having resiliently mounted gears that insure proper gear meshing without risk of jamming its gears when the reset mechanism is actuated. In the idle condition of the reset mechanism, the gears of the mechanism are locked in a fixed position. The reset mechanism is further characterized by utilizing a gear shifting means that can be ultrasonically cleaned without damaging any of its components, and that can be easily and precisely calibrated.

PATENTED JUN 22 1971

Inventors,
Donald M. Ham,
Joseph G. Russillo, Jr.,
by Dale P. Myles
Their Attorney.

Inventors,
Donald M. Ham,
Joseph G. Russillo, Jr.
Vale P. Myles
by
Their Attorney.

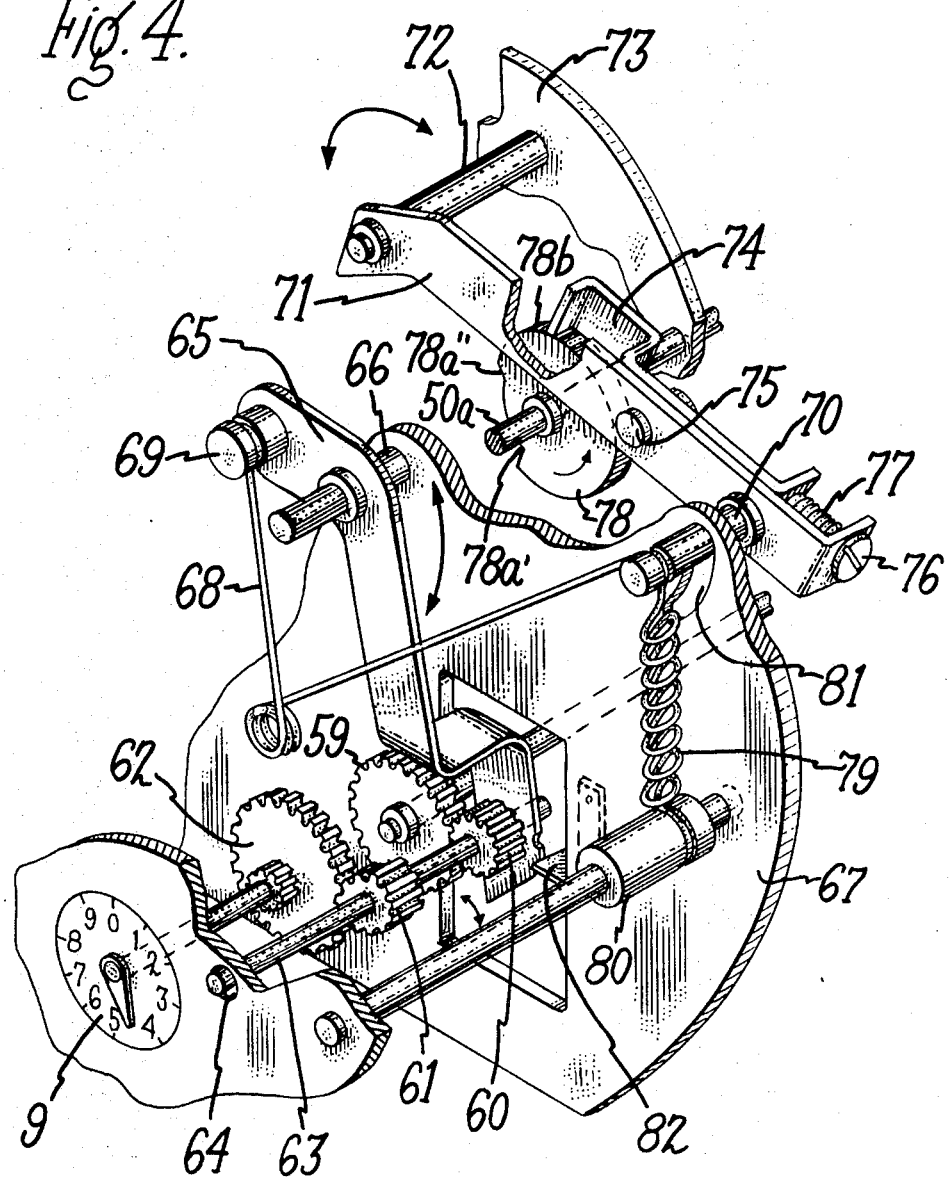

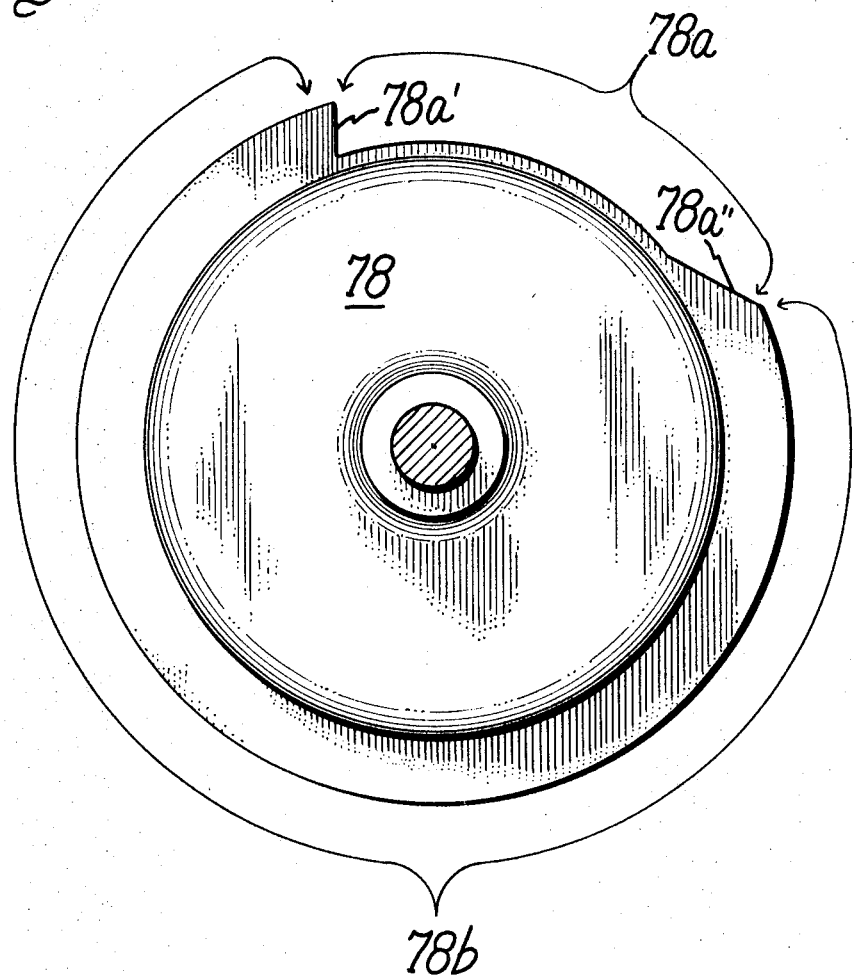

RESET MECHANISM FOR A CUMULATIVE DEMAND REGISTER

The invention disclosed herein relates to register devices and more particularly to devices for measuring maximum demand of a variable quantity, such as maximum watthour consumption during a preset time interval.

As the description of the invention proceeds, it will be apparent to those skilled in the art that it may be incorporated in various devices for measuring variable quantities; however, since the invention is particularly suitable for use in demand meters of the type utilized to measure maximum demand of electric energy consumption, the following description of the invention will assume that it is incorporated in a device for measuring maximum demand of electric energy. In demand registers of the type now commonly associated with watthour meters it is well known to provide a single sweep hand that is rotated about an axis to indicate on an associated dial the maximum demand for electric energy during a plurality of equal, preset time intervals. It has also become fairly standard practice to use decimal digit or decade counters to indicate a summation of total maximum demand in a manner similar to that employed to indicate total watthour consumption of electric energy. Prior to the present invention means have been developed for periodically correlating the maximum demand indicated by such a decade demand indicator with the demand shown on the above mentioned type of sweep hand indicator. Normally, such means include a reset mechanism that operates to move the sweep hand back to its zero or base position while simultaneously coupling the decade demand indicator to the sweep hand mechanism in a manner such that the decade demand indicator is rotated to indicate the total demand that had been recorded by the sweep hand indicator. In such reset mechanisms some sort of friction clutch is ordinarily used to allow the normally forward motion of a portion of a gear train to be reversed during a resetting operation. While such clutches have been found to be completely acceptable for performing their assigned clutching function, it has been discovered that when ultrasonic cleaning methods are employed to clean the meter drive mechanism, such clutches are often destroyed. Thus, since ultrasonic cleaning has been recognized as a desirable method of maintaining demand meters, it would be desirable to provide such a reset function that would be capable of operating without the use of a friction clutch.

It is also well recognized in the field of demand metering that precise and reliably accurate measuring means must always be used. Accordingly, it is necessary in manufacturing any reset mechanism to provide means for precisely and easily calibrating the mechanism to provide accurate maximum demand indicating capability. It is also desirable to provide means for assuring that the decade dial maximum demand indicating register is locked in a fixed position during its idle condition so that meter vibration or other spurious input does not result in erroneous indication of maximum demand on the dial indicator.

Accordingly, it is an object of the invention to provide an improved register suitable for measuring the peak value of a variable quantity.

Another object of the invention is to provide an improved plural order decimal digit or decade counter device which can be reset without injury to its component parts.

Still another object of the invention is to provide a demand register having a reset mechanism that can be easily and accurately calibrated.

Yet another object of the invention is to provide a demand register reset mechanism that is constructed entirely of components that are not subject to destruction by ultrasonic cleaning of the meter.

A further object of the invention is to provide a demand register reset mechanism having means for positively locking a maximum indicating decade dial device during the idle condition of the reset mechanism.

Other objects of the invention will be apparent from the following description taken in conjunction with the accompanying drawings in which:

FIG. 4 is a perspective sectional view of a portion of the device shown in FIG. 3 illustrating the operating parts in a second mode of operation.

FIG. 5 is a top plan view of a cam disc utilized in the embodiment of the invention depicted in FIG. 1

Figures 1, 2:
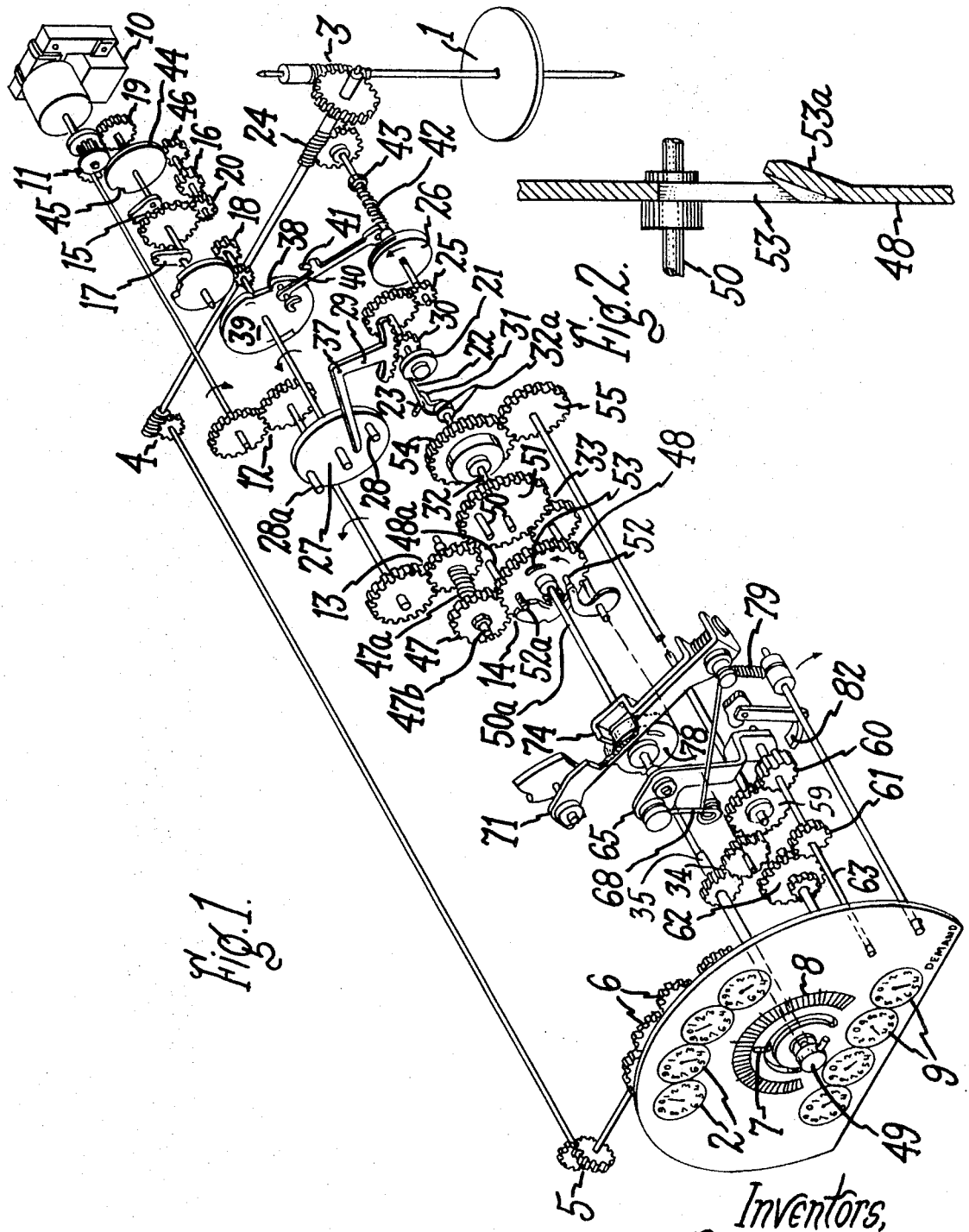
FIG. 1 is a schematic perspective view of a watthour meter and demand register embodying the invention.
FIG. 2 is a side elevation, in cross section, of a cammed gear wheel embodying a unique aspect of the invention.

Although the invention may be readily adapted for use with different types of demand registers, for illustrative purposes, to facilitate an understanding of the invention, it will be described in context with an induction watthour meter and demand register of the type used to record watthour consumption and maximum energy demand during preset time intervals. Thus, referring to FIG. 1 of the drawing there is shown a rotor disc 1 that may be taken to represent the disc of an induction watthour meter. The disc 1 is coupled to drive a watthour indicating register 2 through gears 3, 4, 5 and 6 so that the register 2 will record total kilowatt hour consumption of a system monitored by the meter. A sweep hand or pointer 7 of a maximum demand indicator is associated with a scale 8 that is also mounted on the face of the meter below the register 2. The pointer 7 is normally reset to a base or zero position at the end of each month after a meter reader has recorded the maximum demand reading indicated on the scale 8. An accumulative demand register 9 is positioned on the face of the meter below the scale 8 and is adapted to record a summation of the maximum demand readings indicated by the sweep hand 7. It will be understood by those skilled in the art that to accomplish this summation function the register 9 is coupled to the drive mechanism for pointer 7 in a suitable manner, which will be discussed in greater detail below, so that the register 9 is advanced only when the maximum demand pointer 7 is reset to its zero position.

A constant speed timer motor 10 which may be an alternating current synchronous motor of the type used in driving clocks is also mounted in a suitable manner in the illustrated meter. As will become clear when the description of the invention proceeds, the motor 10 is used to establish a demand measuring time interval as well as to drive a mechanism that performs a periodic 30 minute resetting operation, and pursuant to the invention disclosed herein it is also used to drive a gear train that resets maximum demand pointer 7 while simultaneously adding the maximum demand indicated by the pointer 7 to the accumulative register 9 at the end of a predetermined period, such as at the end of each month. The drive means for effecting the monthly resetting operation is preformed through gear train 11, 12, 13 and 14; while the 30 minute interval demand reading is established and a 30-minute interval resetting operation is performed through a multiple-unit mutilated gear train 15, 16, 17 and 18, and gears at 19 and 20 interconnecting the mutilated gear train with the motor 10 and with each other.

The demand register operating member which is reset to a zero position every 30 minutes is represented as comprising a rotatably mounted disc 21 having a pusher member or dog 22 thereon and an adjustable calibrating screw 23 threaded through pusher member 22. The pusher member 22 is advanced in a clockwise direction by the rotation of meter 1 applying a driving force to it through gearing at 24 and 25 and a friction clutch at 26 in accordance with the demand to be measured. The pusher member 22 is periodically reset to its base or zero position by being moved in a counterclockwise direction every 30 minutes by the driving action of motor 10 operating through the mutilated gear timing interval mechanism which includes a rotatably mounted disc 27 having pins 28 and 28a mounted thereon, which are adapted to engage and actuate a gear sector lever 29 that in turn is in meshing engagement with a rotatably mounted gear 30 on the shaft that drives the pusher member disc 21.

In operation, when pusher member 22 is advanced by the driving action of meter 1, it is positioned to engage an operated member and push a cooperating dog on this operated member 31 fixed on a shaft 32. The shaft 32 is in driving relation with the sweep hand or pointer 7 through gears at 33 and 34 and a hollow rotatable shaft 35. For the purpose of describing the invention, the maximum demand pointer 7, the pushed member 31, pusher member 22 and gear sector 29 of the interval reset mechanism are depicted in what may be considered a one-half full scale position, with respect to indicating scale 8, and with operating member 22 in driving contact with operated member 31. The zero or base reset position of operating member 22 is when this member is rotated counterclockwise from the position shown in FIG. 1 to its maximum excursion, as determined by the movement of lever 29 in the following manner. Such a resetting operation is accomplished by rotation of disc 27 counterclockwise during a one-fourth revolution movement from approximately the position shown in FIG. 1. During such movement, pin 28 engages the end of gear sector lever 29 and moves it upward and to the right, thus rotating the lever clockwise about its pivot at 37 so that its gear sector rotates gear 30 and the operating member 22 to their zero position as pin 28 clears and moves past the end of lever 29.

During such an interval resetting operation, the cam surface 38 on a rotatably mounted cam disc 39 engages a pivotally mounted lever 40, pivoted at 41, and swings it to disengage the clutch 26 between meter 1 and the pusher member 22. The clutch 26 is normally held closed by a spring 42 that has an adjustable tensioning nut 43.

It will be understood by those skilled in the art that means must be provided to prevent rotation of the gears 19 and 20 except when they are supposed to be precisely advanced during an interval resetting function. Also, in order to determine the precise duration of the periodic reset interval a suitable gear ratio must be selected for use between timing motor 10 and the rotatable disc 27. Suitable mechanisms for performing these functions are described in detail in U.S. Pat. No. 2,497,678-MacIntyre et al. issued Feb. 14, 1950, and assigned to the assignee of the present invention. The mechanisms described thus far correspond generally to those illustrated and discussed in that patent and like reverence numerals have been used for similar parts to facilitate an identity between corresponding parts illustrated in this application and that patent. Accordingly, a further detailed description of the mechanism for locking the gears 19 and 20 and for obtaining a precise periodic interval timing function will not be discussed in greater detail at this time but the reader may refer to the foregoing patent for a fuller description of these relatively standard functions if such a description is desired.

In order to understand the operation of the invention disclosed herein, it should be understood that the meter 1 operates to advance pusher member 22 during a 30- minute period so that this member will engage and advance the pushed member 31 and, thus, move demand pointer 7 if it has not already been advanced by a preceding demand measuring operation, in proportion to the demand measured by the meter 1 during the 30- minute period. Then, the operating member 22 is reset to its zero or base position while the operated member 31 remains in its advanced position. In order to assure that the pushed member 31 will remain in its advanced position when the pusher member 22 is returned to its zero position, a spring 32a is rigidly mounted on a meter housing support member (not shown) and is biased into frictional engagement with the shaft 32, or a suitable cam surface on this shaft. This frictional engagement between the shaft 32 and spring 32a is not strong enough to prevent the shaft 32 from being rotated during a monthly reset operation when indicating pointer 7 and the pushed member 31 are returned to their base or zero positions.

The apparatus for resetting demand pointer 7 is somewhat similar to that described in the above-mentioned U.S. Pat. No. 2,497,678, with unique structural differences that will be explained in detail below; however a brief description of this resetting operation will be given here. Accordingly, it can be seen that gear 47 is continuously driven by timer motor 10 through gearing 11, 12 and 13 to rotate gear 47 in a clockwise direction. Except during the monthly reset operation, gear 47 is out of mesh with gear 48. However, when the demand indicator pointer 7 is to be reset, knob 49 on the end of a shaft 50a is pushed inwardly, i.e., toward the face of the meter, by the meter reader. This movement of the shaft 50a is resiliently resisted by a spring (not shown) between the knob 49 and a suitable rigid mounting behind the face of the meter plate. Since the gear 48 is rigidly mounted on shaft 50a it is forced into engagement with gear 47. A spiral spring 47a is mounted on the drive shaft of gear 47 and has one of its ends fixed to either the gearing 13 or the drive shaft and its other end fixed to gear 47. The gear 47 is slidably mounted on its drive shaft and is biased against a locking nut 47b by spring 47a. Therefore, when gear 48 is pushed into engagement with gear 47 during a monthly reset operation, if gear 47 does not immediately mesh with gear 48 the axial movement of the gear 48 will push gear 47 axially against spring 47a which will continue to resiliently bias gear 47 toward meshing engagement with the gear 48. Thus, these gears are prevented from jamming and are smoothly meshed as gear 47 continues to rotate. In the preferred embodiment of the invention illustrated in FIG. 1, the diameter of spring 47a is approximately one-fourth of the diameter of gear 47, in order to provide a firm biasing force that tends to maintain gear 47 in direct driving relation with gear 48 against a tendency of that gear to be pivoted at an angle with respect to the plane of gear 48 when it is moved axially against the spring 47a.

The position of gears 47 and 48 shown in FIG. 1 is that attained after knob has been pushed in and driving engagement has been obtained between gears 47 and 48. In this condition, gear 48 is rotated in a counterclockwise direction by the driving action of motor 10. A pin or dog 48a suitably mounted on the rear surface of gear 48 engages and drives a pin or dog 50 suitably mounted on the face of gear 51. As can be seen, gear 51 is in driving relation with demand pointer 7 through a gear train comprising gears at 33 and 34 and hollow shaft 35 of the reset mechanism. It will be remembered that at the time knob 49 is depressed pointer 7 has a position prior to reset which corresponds to the maximum demand measurement in any 30-minute interval since the last monthly reset operation.

In the normal condition of gear 48, prior to a monthly reset operation, a pair of stationary pins or dogs 52 and 52a, suitably mounted on a rigid meter housing member, are aligned with a pair of arcuate slots in gear 48, one of which is shown at 53. During the monthly reset operation when the reset initiating control means comprising knob 49, shaft 50a and gear 48 are depressed, gear 48 is pushed inwardly and the pins 52 and 52a are disengaged from these slots (53), thus allowing gear 48 to be driven by gear 47. It can be seen that when these slots are out of alignment with the pins 52 and 52a pushed knob 49 may be released, because the gear 48 will be held in its pushed-back position by the rear ends of pins 52 and 52a riding on the face of gear 48 until it completes one revolution. It will be understood that the pins 52 and 52a and their corresponding slots are on different radii so that a complete revolution of gear 48 occurs before the pins snap back into the slots to complete a monthly resetting operation. As is well known practice in the demand meter art, gear 48 has a portion of its gear teeth extended to the rear to mesh with gear 47 after the gear 48 has returned to its forward position when pins 52 and 52a drop into their corresponding slots. This extended portion of gear 48 completes the resetting operation before the gears run out of mesh.

An important feature of the invention disclosed herein is the provision of axial camming means on the gear 48 to insure against the meter being jammed during a monthly reset operation. This camming means can be seen by referring to FIG. 2 of the drawing which depicts a cross-sectional side elevation of gear 48 taken along a plane that bisects the slot 53. It can be seen that a ramp or cam 53a is provided at one side of slot 53. The surface of cam 53a facing toward the front of the meter provides means for biasing gear 48 axially away from pin 52 at the end of pin 52 rides on this surface. In other words, the surface 53a comprises a ramp having its lowermost surface, or its most rearwardly deflected surface, at the forward end of slot 53 and this surface forms a continuous smooth ramp that eventually ends at the front surface of gear 48. In operation, when a monthly reset function is initiated by pushing knob 49 inward, there is some risk in conventional meters that gears 47 and 48 could engage and commence to rotate before the pins (52 and 52a) had actually cleared their respective slots, therefore, the meter could be jammed when pins 52 and 52a came in contact with the normal sharp rear edge of slot 53, thus preventing further motion of the gear 48. However, with the unique cam surface 53a of the present invention, such a jamming of the meter is positively prevented, because as soon as the driving action of gear 47 with gear 48 starts to rotate gear 48 the rearmost end of pin or dog 52 rides up ramp 53a and forces gear 48 to move axially out of engagement with pins 52 and 52a. In the preferred embodiment of the invention, a similar ramp is associated with the other slot in gear 48 and adapted to coact with pin 52a in similar manner, but it will be understood that a single ramp will provide the desired jam-free operation of the reset mechanism. It is to be understood that camming ramp surfaces similar to ramp 53a could be provided on other components of the mechanism, such as on cam disc 78, that are directly mounted to gear 48 to effect the desired camming action. Such alternative arrangements are within the intended scope of the invention.

As can be seen in FIG. 1 of the drawing, gear 51 is permanently coupled to gear 54 by being mounted on a common shaft 32. Therefore, when pin 48a on gear 48 is rotated into contact with pin 50 on gear 51, gear 54 is rotated and, since it is in continuous meshing engagement with gear 55, the gear 55 is also rotated. It will be understood that gear 55 is directly coupled through a suitable gear train ratio to the first dial gear (62) of register 9. This coupling is depicted in FIG. 1 by a dotted line comprising a portion of the drive shaft mounting gear 55. However, this gear train is shown in more detail in FIG. 3 of the drawing.

Figure 3:
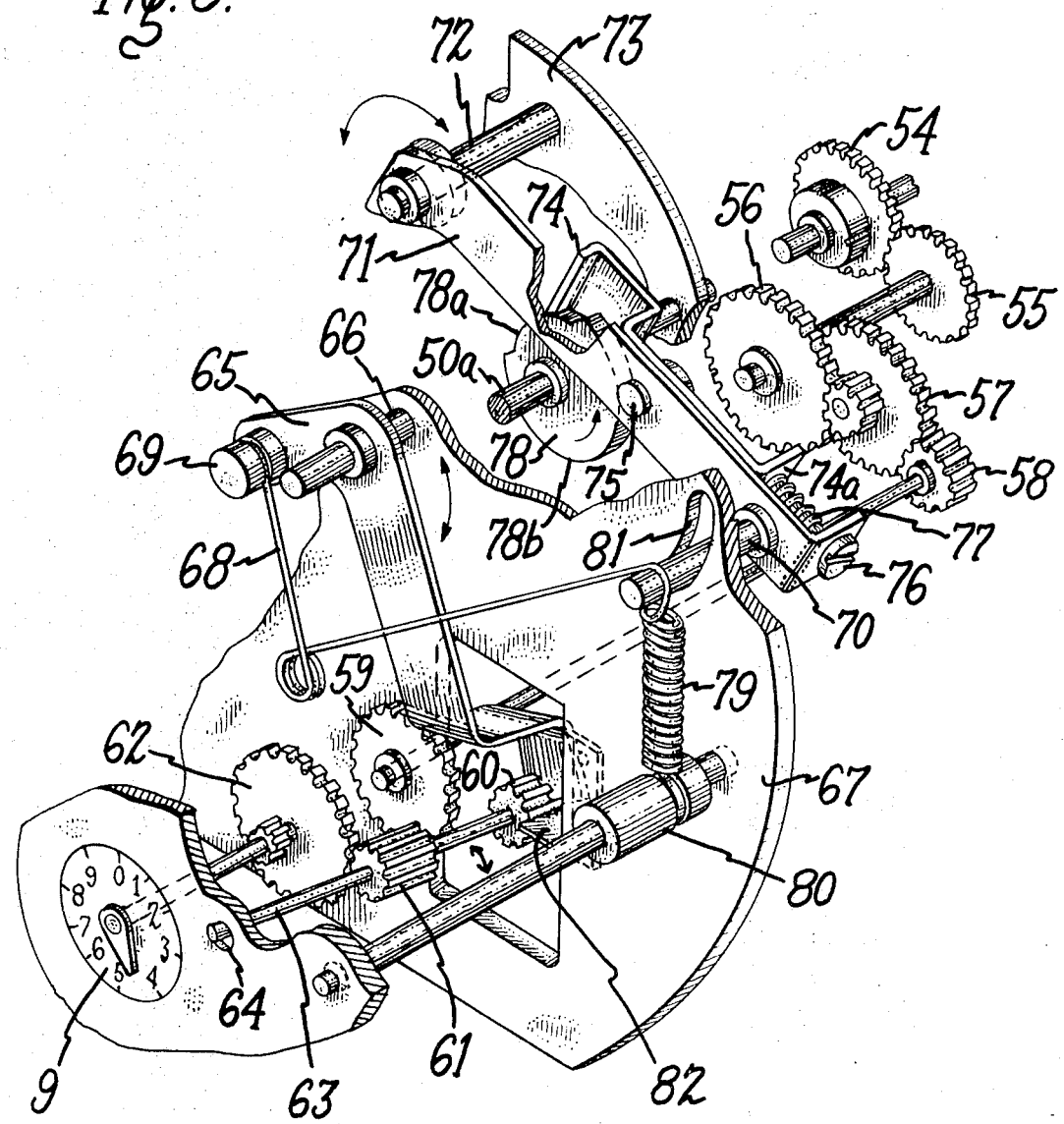
FIG. 3 is a perspective sectional view of a portion of the demand register shown in FIG. 1 illustrating the operating parts thereof in a first mode of operation.

Reference will now be made to FIG. 3 of the drawing to describe further unique structural and functional elements of our invention. It will be remembered during this description that gear 54 is directly coupled to indicating pointer 7 so that as drive gear 47 rotates the pointer 7 to its zero position, gear 54 is simultaneously rotated to drive gear 55. And gear 55 is coupled through gears 56, 57, 58, 59, 60 and 61 to a first gear 62 of a dial gear train that is adapted to drive the dials of register 9. It will be understood by those skilled in the art that each of the indicating hands on the dials of register 9 are directly coupled to a rotatably mounted gear that is permanently in driving relation with gear 62, and each of these dial gears has a preset ratio, normally 10 to 1, that makes the register 9 a decade measuring register. In FIG. 3 of the drawing, the gear 59 is shown uncoupled from gear 60, which is the normal condition when the meter is not in a monthly reset phase of operation.

As mentioned above, one of the functions of the monthly reset operation is to record on cumulative demand register 9 the maximum demand indicated by pointer 7 during the prior month. Accordingly, our invention provides a unique mechanical means for accomplishing this function. This unique mechanical means of the invention includes a gear shifting means that is operable to couple and uncouple the gears 59 and 60 to initiate a recording operation of register 9 when pointer 7 starts its movement toward a zero position, and to terminate this recording operation when pointer 7 reaches its zero position, and then lock the dial gears of register 9 in a fixed position so that random motion does not occur when the register 9 is in its standby phase during the rest of the succeeding month before the next reset operation. The shifting means of the illustrated embodiment of the invention is made up of the pair of gears 60 and 61 that are mounted in fixed relation to each other on drive shaft 63. The forward end of drive shaft 63 is pivotally mounted on the face of the meter in an aperture 64 while the rearmost end of shaft 63 is pivotally mounted in one end of a lever 65, which in turn is mounted on a pivot shaft 66 fastened to a support plate 67 that is fixed in relation to the meter housing. Movement of pivotally mounted lever 65 around its pivot 66 is regulated through a resilient link member 68 comprising a spring that has its first end connected in a suitable manner to a pin 69 on the opposite end of lever 65. The other end of spring 68 is connected in a suitable manner to a pin 70 which in turn is mounted on a lever 71. Lever 71 is also pivotally mounted on a pin 72 that is suitably supported in another rigid plate member 73 fastened to the meter housing or other available rigid support means. In addition to its connection with lever 65, lever 71 has slidably attached to it a cam-riding lever arm 74 that is adapted to slide with relation to a positioning rivet 75 that extends through levers 71 and 74. The exact relation between these two levers is determined by the position of a calibrating means in the form of a screw 76 that is rotatably mounted in one end of lever 71, as shown in FIG. 3, and threaded through an aperture (not shown) in the tab 74a on one end of lever 74. A spiral compression spring 77 biases the tab 74a away from the end of lever 71 and thereby retains the screw 76 in any position to which it is moved during a calibrating operation. Thus, it will be seen that the actuation of demand summation register 9 can be precisely and easily calibrated by manually adjusting the screw 26 thereby to selectively vary the relative position of the lever 74 with respect to cam member or disc 78.

The relative positions of the lever means are controlled by a lever-position control means comprising a cam disc 78, which is rotatably mounted on the shaft 50a that also has reset gear 48 positioned on it as shown in FIG. 1. Thus, cam disc 78 and gear 48 rotate in unison. The lever position-control means also includes a tension spring 79 having one of its ends fastened to the pin 70 in lever 71 and its other end fastened to a second pin 80 mounted in the support plate 67. Cam disc 78 is designed primarily to move the lever means to shift gears 59 and 60 to and from their coupled and uncoupled relation. Toward this end, cam disc 78 is designed to have a depressed peripheral portion generally indicated at 78a and a raised peripheral portion generally indicated at 78b in FIG. 3 of the drawing.

FIG. 5 of the drawing illustrates the camming surfaces of cam disc 78 in greater detail. Referring to FIG. 5, it can be seen that the leading surface 78a' of depressed surface 78 is essentially perpendicular to the peripheral surface of the disc whereas the trailing end 78a'' of this depressed surface is more gently sloped. This construction of cam disc 78 allows the cam-riding lever 74 to snap rapidly into the depressed portion 78a' and thus rapidly move resilient link 68 to an over-center position with respect to the pivot of lever 65 so this lever moves to uncouple gear 60 from gear 59 by moving it to the position shown in FIG. 3. The gentler sloped surface 78a'' relatively slowly moves the lever 71 to its uppermost position, but again the gear 60 is moved rapidly toward meshing engagement with gear 59 when resilient link 68 is moved over-center in the opposite direction with respect to pivot 66 of lever 65. However, if gear 60 does not immediately mesh with gear 59, the resilient link yields enough to hold these gears in contact without jamming or damaging them until meshing is attained.

Referring back to FIG. 3 of the drawing, it can be seen that pin 70 mounted on lever 71 is disposed in a slot 81 in plate support member 67. The bottom end of slot 81 serves as a limit stop to restrict the downward movement of pin 71 in response to the tensioning force of spring 79. It will be appreciated that the load placed on cam disc 78 can be relieved by controlling the depth of slot 81 with relation to the depth of the depressed portion 78a on cam disc 78 in a manner such that the cam riding lever 74 barely contacts this depressed portion of the cam disc 78. A final unique structural feature of the present invention is the gear locking means that prevents the dial gears of register 9 from rotating when the reset mechanism has moved gear 60 to the position shown in FIG. 3. In the preferred embodiment of the invention, this locking means comprises a resilient leaf spring member 82 mounted on the support plate 67 by any suitable manner, such as by riveting it to plate 67, as is perhaps best seen in FIG. 3 of the drawing. When the gear 60 is in the uncoupled position shown in FIG. 3, its teeth are engaged by the lowermost end of the spring blade or gear braking member 82 and thus securely locked in position against rotation. It will be understood that when gear 60 is locked against rotation by member 82, gear 61 is in engagement with the first dial gear 62 of the dial gear train of register 9, so each dial of register 9 is prevented from rotating by the locking action.

In order to more fully describe the reset mechanism of the invention, its operation will now be discussed. First, it will be assumed that the reset mechanism is in its idle condition, as shown in FIG. 3 of the drawing, i.e., that condition normally occupied by the mechanism during the month when a resetting function is not being performed. In this mode, cam disc 78 is positioned so that its depressed portion 78a is in contact with the cam-riding surface of lever 74. Thus, tension spring 79 holds the pin 70 against the bottom end of slot 81 and thereby positions the lever 71 in its most clockwise position. The resilient link 68 formed by the spring connected between pins 70 and 69 transmits a downward force to the pin 69 that forces lever arm 65 to pivot with a rapid snap-action around its pivot pin 66 and move its other end upward, to a position where gear 60 is uncoupled from gear 59 and brought into locking engagement with brake means 82 when link 68 is moved to an over center position with respect to pivot 66. This relationship of the component parts is illustrated in FIG. 3 of the drawing. Now to explain the operation of the reset mechanism reference will be made to FIG. 4 of the drawing in which the component parts are depicted in the relative positions that they attain when a reset function has been initiated. This same relative relation of the component parts is also shown in FIG. 1 of the drawing, as noted above. Thus, in the manner described above with reference to FIG. 1, the cam disc 78 shown in FIG. 4 has been rotated by its driving engagement with gear 18 so that cam-riding lever 74 has been forced up the slope surface 78a" of the cam disc to thereby cause the lever 71 to be pivoted in a counterclockwise direction around its mounting pin 72 to a point where it brings the pin 70 to its maximum upward excursion in slot 81. This upward movement of pin 70 coupled with the pivotal movement of link 68 around pin 69 exerts an upward force on pin 69 through the spring link 68 which forces lever 65 to rotate rapidly in a clockwise direction around its pivot pin 66 when link 68 moves to an overcenter position with respect to pivot 66, and thereby swings the opposite end of lever 65 toward gear 59 to bring gear 60 into engagement therewith. As explained above, the resilient link means 68 insures smooth meshing of gear 60 with gear 59 without risking danger to these gears if an immediate mesh is not attained. In other words, even after cam-riding lever 74 has been moved to its maximum upward position by the continued rotation of cam disc 78, it is possible that gear 60 may not have completely meshed with gear 59; however, the resilient biasing action of the spring link 68 allows these gears to continue to rotate until such a mesh is attained without risking damage to either of the gears. When gear 60 is meshed, as shown in FIG. 4, it drives the gear 61 which is constantly coupled to the dial gear 62 and, thus, initiates the monthly summary recording of maximum demand that had previously been recorded by pointer 7.

It will be understood that the demand register 9 will not be actuated immediately when gear 60 is coupled to gear 59 but such actuation occurs as soon as the driving operation of gear 47 (see FIG. 1) is effective to move dog 48a (on gear 48) into contact with dog 50 to start the gear 59 rotating through the train of gears 54 — 59. Thus, it can be seen that the reading on pointer 7 is exactly correlated to the measure of demand recorded by register 9 because both of these functions are controlled by the movement of pin 50 on gear 51.

After gear 47 has driven the gear 48 to a position where pins 52 and 52a snap into their respective slots (53) in gear 48, to return pointer 7 to its zero position and to record monthly maximum demand measurement on register 9, cam follower 74 drops into depression 78 and uncouples drive gear 59 from gear 60 to stop register 9; however, because some of the teeth on gear 48 are extended to maintain engagement temporarily with gear 47, to drive pointer 7 slightly past its zero position. Then, the few extended teeth on gear 48 are rotated to a position where no further extended teeth exist to mesh with gear 47 and the register is thus placed in its null condition until knob 49 is again depressed for the succeeding monthly readout, which re-initiates the above-described cycle of operations. This overdrive of pointer 7 obviates the possibility of an erroneous reading being recorded by the register if torque should be applied to gear 48 when it returns to its forward-most position. From the foregoing description of the invention it will be understood that the parts illustrated have been spread about considerably and extra shafting has been shown for purposes of clarity. In actual practice, the mechanism of the invention is made very much more compactly than the illustrations herein would indicate. Also, various necessary adjustments and refinements of the invention which are not necessary to an understanding of it have been omitted from the description in the interest of simplifying its presentation. However, it will be understood by those skilled in the art that the unique features of the invention may take numerous different embodiments that would enable it to be adapted to various types of variable quantity measuring devices, and all such embodiments are within the true intent and scope of the invention.

We claim:

1. In a demand meter, an operating mechanism comprising an operating member adapted to move from a base position a distance proportional to the magnitude of a variable quantity, an operated member adapted to be engaged by the operating member and to be moved by it to a position representing the maximum distance in a given direction said operating member is moved from its base position, a first indicating means responsive to the movement of the operated member and adapted to move from a zero position to a position indicative of the maximum movement in said given direction of said operated member, means permanently and directly coupling the first indicating means to the operated member, a reset mechanism for returning the first indicating means to its zero position, a second indicating means comprising at least one rotatably mounted indicator coupled in driven relationship to a dial gear, mechanical means adapted to couple said second indicating means to the reset mechanism, said mechanical means including a gear train one gear of which is shiftable from a first position where it is uncoupled from meshing engagement with other gears in said gear train to a second position where it is coupled in non-slip, direct driving relationship to other gears in said gear train and thereby is coupled in direct driving relationship to said reset mechanism, shifting means that are operable to selectively shift said one gear of the mechanical means from its first position to its second position and to hold said one gear in either of said positions, whereby said rotatably mounted indicator of the second indicating means is coupled in driven relationship through said mechanical means to said reset mechanism when the shifting means is operated to shift said one gear of the mechanical means into its second position, said reset mechanism being further operable in response to said one gear of the mechanical means being shifted into its second position to drive said rotatably mounted pointer of the second indicating means to a position indicative of said maximum movement in said given direction of the operated member.

2. An invention as defined in claim 1 wherein said first indicating means comprises a rotatably mounted pointer adapted to rotate through an angle less than 360° and said second indicating means comprises at least one rotatably mounted pointer adapted to rotate through an angle greater than 360°.

3. An invention as defined in claim 1 wherein said reset mechanism comprises a second gear train, driving means for driving said second gear train, and reset-initiating control means for selectively connecting said driving means to drive said second train, said reset-initiating control means being manually operable to connect it in driven engagement with said driving means and being further operable to be driven by said driving means through a range of movement that is proportional to the maximum movement in said given direction of the first indicating means before said reset-initiating control means is effective to connect said driving means to said second gear train.

4. An invention as defined in claim 3 wherein said shifting means comprises lever means, lever-position control means for selectively moving said lever means to and from first and second predetermined positions, said lever means being effective when moved to said first position to uncouple the second gear train from said one gear of the dial gear train, said lever means being further effective when moved to said second position to couple the second gear train to said one gear of said dial gear train.

5. An invention as defined in claim 4 wherein said lever means comprises a first gear wheel and a second gear wheel positioned on a pivotally mounted drive shaft, means mounting said drive shaft for pivotal movement whereby said first gear wheel is maintained in driving engagement with said one gear of said dial gear train while said second gear wheel is adapted to be moved to and from driving relationship with said second gear train, first and second pivotally mounted levers, and link means operatively interconnecting said first and second levers, said first lever being adapted to move said pivotally mounted drive shaft to move said second gear wheel to and from driving relationship with said second gear train, said second lever being operatively coupled to said lever-position control means and adapted with said link means to make the movement of the first lever responsive to said lever-position control means.

6. An invention as defined in claim 5 wherein said link means comprises a resilient member connected to said first and second levers and adapted to provide a flexible drive therebetween that moves said first lever to uncouple the second gear train from said one gear of the dial gear train when the second lever is moved to said first position by said lever-position control means, and that yieldably biases said first lever to couple the second gear train to one said one gear of the dial gear train when the second lever is moved to said second position by said lever-position control means.

7. An invention as defined in claim 6 including resilient means operatively connected to bias said lever means toward said first position.

8. An invention as defined in claim 4 wherein said lever-position control means comprises a cam member having a surface adapted to contact said lever means and move it to and from said first and second positions when said cam member is moved in a predetermined manner, and means for selectively moving said cam member is said predetermined manner.

9. An invention as defined in claim 8 wherein said means for selectively moving said cam member comprises manually operable means.

10. An invention as defined in claim 8 wherein said means for selectively moving said cam member comprises mechanical means for coupling said drive means to said cam member in driving relation, whereby said cam member is driven by said drive means in said predetermined manner.

11. An invention as defined in claim 8 wherein said means for selectively moving said cam member comprises manually operable means and also includes mechanical means for coupling said drive means to said cam member in driving relation, whereby said cam member is selectively movable by either said drive means or manually.

12. An invention as defined in claim 8 wherein said cam member comprises a rotatably mounted cam disc having a substantially circular peripheral surface with a single recessed portion therein of predetermined length, said circular peripheral surface and recessed portion being the surface of said cam member adapted to contact said lever means.

13. An invention as defined in claim 12 wherein said cam disc is provide with at least one slot radially spaced between the center of the cam disc and said peripheral surface, a dog adapted to fit into said slot and prevent the cam disc from rotating with respect to said dog, means for causing relative movement between said dog and said cam disc to remove said dog from said slot whereby the cam disc is freed for rotary movement, said means for causing relative movement including a sloped surface disposed on said cam disc adjacent one end of said slot and adapted to engage said dog to force the cam disc away from the dog when the cam disc is rotated.

14. A demand meter as in claim 1 including a gear locking means and a first gear that is adapted to be moved from a first position where it is prevented from rotating by said locking means to a position where it is meshed with a second gear and rotated, the improvement comprising means operable to free said first gear from the motion preventing effect of said locking means before said second gear is meshed therewith.

15. A demand meter as in claim 1 including a first gear that is adapted to be moved into meshing engagement with another gear mounted adjacent thereto, the improvement comprising means operable to resiliently bias said second gear toward first gear but further operable to allow one of said gears to be forced to move away from the other of said gears if meshing engagement is not attained therewith, whereby said second gear is caused to rotate by engagement with the first gear even when not meshed therewith until the teeth of the two gears become aligned and proper meshing takes place without jamming the gears.

16. In a demand meter as defined in claim 1 having a rotatable cam disc, a cam-riding lever adapted to engage a control surface of said disc, a second lever movably mounted on said cam-riding lever and also mounted for pivotal movement around a fixed point on the meter, the improvement comprising a threaded calibrating screw rotatably mounted in a threaded aperture of said cam-riding lever and through a bore in said second lever, said screw being adapted to adjust the position of the cam-riding lever with respect to said cam disc control surface and said fixed point on the meter when the screw is rotated, and a compression spring mounted around said screw and adapted to bias the two levers away from each other thereby to bias the screw against rotation.

17. An invention as defined in claim 3 wherein said one gear of said dial gear train is selectively coupled by said shifting means in non-slip, meshing engagement with the gears of said second gear train when said reset-initiating control means is manually operated to connect it in driven engagement with said driving means and wherein said dial gear train is driven by said driving means only after said driving means has driven said reset-initiating control means through said range of movement.

18. An invention as defined in claim 8 wherein said manually operable means comprises a calibrating means that is manually operable to move a cam-contacting surface of said lever means with respect to said cam member thereby to selectively vary the relative position of said lever means with respect to said cam member whereby the actuation of the second indicating means is precisely calibrated.

19. An invention as defined in claim 1 wherein all the operating parts of said reset mechanism and said mechanical means are made of materials that will not be damaged by ultrasonic vibration, whereby said parts are adapted to be cleaned by an ultra-sonic cleaning process.

20. An invention as defined in claim 19 wherein said materials are taken from a class including metals, metal alloys, and high-impact-resistant plastics.